(No Model.)
F. SEYMOUR.
APPARATUS FOR PRODUCING SCENIC EFFECTS.
No. 486,606. Patented Nov. 22, 1892.
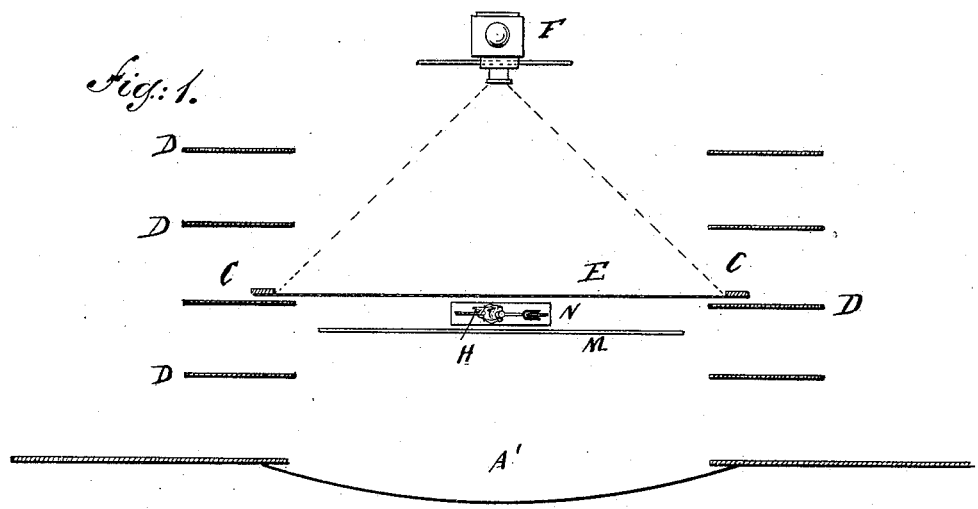
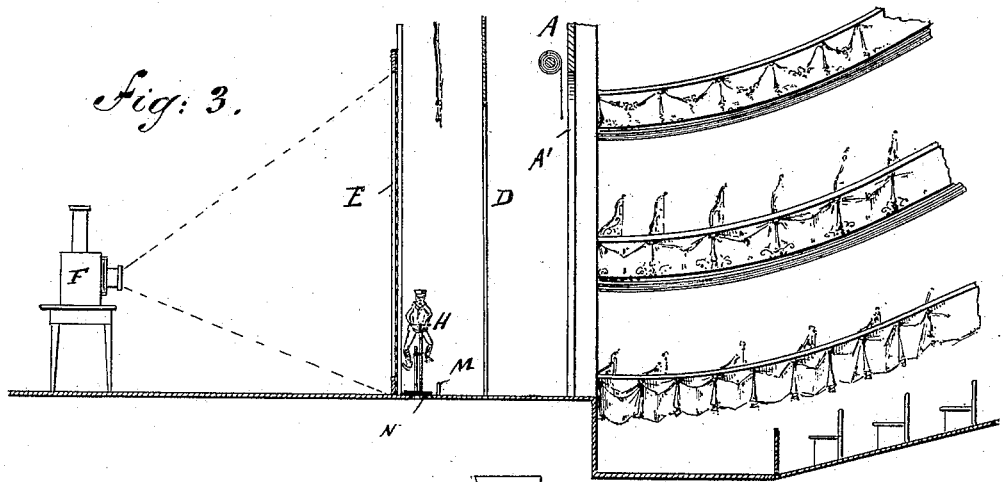
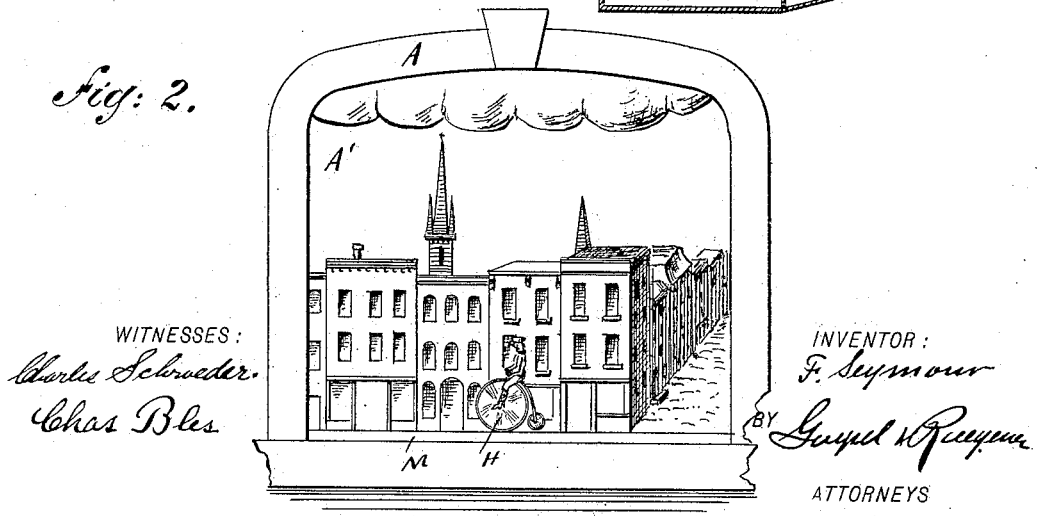
WITNESSES:
Charles Schroeder
Chas Bles
INVENTOR:
F. Seymour
BY
ATTORNEYS

United States Patent Office.

FRANCIS SEYMOUR, OF PATERSON, NEW JERSEY.

APPARATUS FOR PRODUCING SCENIC EFFECTS.

SPECIFICATION forming part of Letters Patent No. 486,606, dated November 22, 1892.

Application filed January 23, 1892. Serial No. 418,989. (No model.)

*To all whom it may concern:*

Be it known that I, FRANCIS SEYMOUR, a citizen of the United States, residing at Paterson, in the county of Passaic and State of New Jersey, have invented certain new and useful Improvements in Apparatus for Producing Scenic Effects, of which the following is a specification.

This invention relates to a new and improved apparatus for producing scenic effects in theaters.

The object of my invention is to provide means for producing on a stage the effects of a moving object, such as a boat, wagon, bicycle, horse, train of cars, &c., which means are simple in construction and highly effective in use.

In the accompanying drawings, Figure 1 is a plan view of part of a stage provided with my improved apparatus for producing scenic effects. Fig. 2 is a front view of the same. Fig. 3 is a vertical transverse sectional view of the same.

Similar leters of reference indicate corresponding parts.

In the drawings, A represents the proscenium arch, and A' the proscenium opening. B B are the front entrance; C C, the second entrance, and D D the wings. A screen E—such as usually used with stereopticons—is placed behind the second entrance C C, and said screen extends entirely across the stage, as shown. A greater or less distance behind said screen a stereopticon F is placed and properly focused, so that the images from the slides are shown sharp, clear, and distinctly upon the screen.

In front of the screen an object H is placed, which object can move; but it does not travel as it does ordinarily when in motion. For example, when said object is a vehicle—such as a bicycle—the same is so suspended or mounted that its wheels can turn in the ordinary manner without propelling the bicycle; but the support on which the bicycle is fixed can be moved slowly across the screen or part of the same. If a person sits on the saddle of the bicycle and rotates the wheel very rapidly, as would be necessary when running the bicycle at great speed, and the slide in the stereopticon is moved in the inverse direction of that in which the bicycle faces, the images thrown upon the screen—for example, trees, fences, houses, &c.—travel across the screen in the direction the reverse of that in which the bicycle faces and will produce the effect of the bicycle running in the direction in which it faces at high speed. Similar effects can be produced when a wagon, a horse, a boat, a train of cars, a sleigh, or other objects are substituted for the bicycle.

In the drawings, M represents a masking-piece such as is ordinarily used in theaters for concealing the slots in the stage, sliding carriages, and the wheels on which imitation boats, &c., are mounted.

N is the carriage with the cycle, which carriage may consist of a platform resting upon the stage and which is drawn over the same either by cord or cable or in any suitable manner, or said carriage can be mounted on wheels or tracks or work in a groove in the stage, as is well known.

Having thus described my invention, I claim as new and desire to secure by Letters Patent—

1. The combination, with a screen placed upon a stage within the stage-opening, of a stereopticon placed behind the screen to throw an image upon the screen, a masking-piece in front of the screen, and a stage property representing a body capable of movement placed between the screen and the masking-piece, substantially as set forth.

2. The combination, with a screen placed upon a stage within the stage-opening, of a stereopticon placed behind the screen to throw an image upon the screen, a masking-piece in front of the screen, a movable support between the screen and the masking-piece, and a stage property on said movable support, substantially as set forth.

In testimony that I claim the foregoing as my invention I have signed my name in presence of two subscribing witnesses.

FRANCIS SEYMOUR.

Witnesses:
OSCAR F. GUNZ,
CHARLES SCHROEDER.